US009085068B2

(12) United States Patent
Schley et al.

(10) Patent No.: US 9,085,068 B2
(45) Date of Patent: Jul. 21, 2015

(54) PITMAN ARM REMOVAL TOOL AND METHOD

(75) Inventors: Chad Schley, Orange, CA (US); Timothy Hume, Orange, CA (US)

(73) Assignee: Schley Products, Inc., Anaheim Hills, CA (US)

(*) Notice: Subject to any disclaimer, the term of this patent is extended or adjusted under 35 U.S.C. 154(b) by 346 days.

(21) Appl. No.: 13/457,329

(22) Filed: Apr. 26, 2012

(65) Prior Publication Data

US 2012/0272499 A1 Nov. 1, 2012

Related U.S. Application Data

(60) Provisional application No. 61/517,923, filed on Apr. 28, 2011.

(51) Int. Cl.

| | |
|---|---|
| ***B23P 19/00*** | (2006.01) |
| ***B23P 19/04*** | (2006.01) |
| ***B25B 27/14*** | (2006.01) |
| ***B25B 27/00*** | (2006.01) |
| ***B25B 5/10*** | (2006.01) |

(52) U.S. Cl.
CPC ............ *B25B 27/0035* (2013.01); *B25B 5/103* (2013.01); *Y10T 29/49822* (2015.01); *Y10T 29/53848* (2015.01)

(58) Field of Classification Search
CPC .... B25B 27/00; B25B 27/0035; B25B 27/02; B25B 27/023; B25B 27/062
USPC ............ 29/426.1, 426.5, 239, 244, 256, 267, 29/270, 281.6
See application file for complete search history.

(56) References Cited

U.S. PATENT DOCUMENTS

| | | | | |
|---|---|---|---|---|
| 2,169,898 | A * | 8/1939 | Minderman | 29/267 |
| 3,835,522 | A * | 9/1974 | Ward | 29/239 |
| 3,845,538 | A * | 11/1974 | Demler, Sr. | 29/234 |
| 4,809,567 | A * | 3/1989 | Bongard | 81/485 |
| 5,003,681 | A | 4/1991 | Schley | |
| 5,781,977 | A * | 7/1998 | Servones | 29/259 |
| 5,906,034 | A * | 5/1999 | Weisshaar | 29/257 |
| 6,128,975 | A | 10/2000 | Schley et al. | |
| 6,574,846 | B1 * | 6/2003 | Kang | 29/239 |
| 6,665,921 | B2 * | 12/2003 | Winterfeldt et al. | 29/426.5 |

(Continued)

FOREIGN PATENT DOCUMENTS

| | | | | |
|---|---|---|---|---|
| DE | 4434152 | A1 * | 6/1995 | B25B 27/02 |
| DE | 4437046 | A1 * | 6/1995 | B25B 27/02 |

(Continued)

*Primary Examiner* — Essama Omgba
(74) *Attorney, Agent, or Firm* — Stetina Brunda Garred & Brucker

(57) ABSTRACT

A pitman arm removal tool and method of removing a pitman arm from a steering box shaft is provided. The pitman arm removal tool includes a puller arm for engaging a lower surface of the pitman arm. A lever arm is disposed a second surface of the pitman arm, in substantially spaced opposed relation with the puller arm. A linking arm connects a first end of the lever arm to a first end of the puller arm, the linking arm being pivotally connected to the lever arm and the puller arm. A bolt assembly connects a second end of the lever arm to a second end of the puller arm, the bolt assembly being adjustable to draw the puller arm closer to the lever arm, thereby urging the pitman arm to traverse the steering box shaft and out of engagement with the steering box shaft spline.

16 Claims, 6 Drawing Sheets

(56) References Cited

U.S. PATENT DOCUMENTS

| | | | | |
|---|---|---|---|---|
| 6,912,936 | B2 | 7/2005 | Hume | |
| D561,544 | S | 2/2008 | Hume | |
| 7,818,860 | B2 | 10/2010 | Hume et al. | |
| 7,849,575 | B2 | 12/2010 | Hume et al. | |
| 8,499,436 | B2 * | 8/2013 | Shen | 29/724 |
| 8,640,316 | B2 * | 2/2014 | Gentner et al. | 29/257 |
| 8,869,366 | B2 * | 10/2014 | Hao | 29/256 |
| 2002/0157232 | A1 * | 10/2002 | Winterfeldt et al. | 29/426.5 |
| 2005/0022380 | A1 * | 2/2005 | Reid et al. | 29/888.011 |
| 2012/0174388 | A1 * | 7/2012 | Shen | 29/724 |
| 2012/0204393 | A1 * | 8/2012 | Gentner et al. | 29/257 |
| 2012/0222335 | A1 * | 9/2012 | Charlton et al. | 37/452 |
| 2014/0059824 | A1 * | 3/2014 | Hao | 29/256 |

FOREIGN PATENT DOCUMENTS

| | | | | | |
|---|---|---|---|---|---|
| EP | 1733846 | A2 | * | 12/2006 | B25B 27/02 |
| EP | 2025474 | A2 | * | 2/2009 | B25B 27/02 |
| FR | 2188418 | A5 | * | 1/1974 | B25B 27/02 |
| FR | 2712836 | A1 | * | 6/1995 | B25B 27/02 |
| FR | 2713972 | A1 | * | 6/1995 | B25B 27/02 |
| GB | 1561011 | A | * | 2/1980 | B25B 27/00 |

* cited by examiner

PITMAN ARM REMOVAL TOOL AND METHOD

CROSS-REFERENCE TO RELATED APPLICATIONS

This application claims priority to provisional application No. 61/517,923, filed Apr. 28, 2011, for Pitman Arm Removal Tool and Method.

STATEMENT RE: FEDERALLY SPONSORED RESEARCH/DEVELOPMENT

Not Applicable

BACKGROUND

This invention relates to a pitman arm removal tool designed to service pickup trucks and SUV applications.

Steering systems on vehicles need periodic service and specifically pitman arm removal for pickup trucks and SUV's for steering system components service. When servicing system components, the pitman arm's female spline is attached to the steering box shaft male spline and needs to be separated when excess play between the pitman arm female spline and steering box male spline becomes a safety issue due to wear between the pitman arm spline and steering box shaft. Available on the market are pitman arm removal tools designed to pull the pitman arm from the steering box, but those tools need adequate space to be inserted. The automotive factory method of separating a pitman arm and steering box using existing pitman arm removal tools on pickup trucks and SUV's is very involved and time consuming. The factory recommends to first disconnect the battery to reduce the potential of triggering the air bag sensor, remove the sway bar, loosen the steering box from the under frame, rotate and lower the steering box to enable the attachment of a standard pitman arm puller then separate the pitman arm from the steering box using a standard pitman arm removal tool.

It is an objective of this invention to provide a low profile pitman arm removal tool. Further, the objective is to have a low profile pitman arm removal tool that reduces the factory repair "book" time needed to remove the pitman arm from the steering box on pickup trucks and SUV's. A further objective is to provide a simple and effective solution to servicing cars, pickup trucks and SUV's pitman arm removal and replacement without removal of the steering box from the car, pickup truck or SUV's frame.

The benefits of the present invention includes ease of use, low profile insertion ability, allowing holding stability when removing the pitman arm on cars, pickup trucks and SUV's time saving for the professional service technician by not having to remove the steering box from the frame.

BRIEF SUMMARY

A pitman arm removal tool and method of removing a pitman arm from a steering box shaft, while the steering box remains in its operating position, is provided. The pitman arm removal tool includes a puller arm for engaging a first surface of the pitman arm, a puller arm defining a substantially "U" shaped recess for receiving the steering box shaft. A lever arm is disposed opposite a second surface of the pitman arm, in substantially spaced opposed relation with the puller arm, the lever arm defining a recess for receiving and engaging a first end of the steering box shaft. A linking arm connects a first end of the lever arm to a first end of the puller arm, the linking arm being pivotally connected to the lever arm and the puller arm. An adjustable bolt assembly connects a second end of the lever arm to a second end of the puller arm, the bolt assembly being adjustable to draw the puller arm closer to the lever arm, thereby urging the pitman arm to traverse the steering box shaft and out of engagement with the steering box shaft spline.

In accordance to one aspect of the invention the engagement of the steering box shaft first end to the lever arm recess precludes radial movement of the steering box shaft relative to the lever arm as the pitman arm traverses the steering box shaft.

In one embodiment, the steering box shaft recess defines a distal end thereof and the lever arm defines a fixed pivot sized to engage the steering box shaft recess. The steering box shaft recess and the fixed pivot remain pivotally engaged as the bolt assembly is tightened.

The pivotal connection between the linking arm and both the lever arm and puller arm allows the linking arm to pivot, in relation to the pulling arm, as the bolt assembly is tightened.

In one embodiment the bolt assembly includes a swivel bolt head, a swivel washer, a threaded bolt shaft, and a nut. The lever arm defines a lever arm recess for receiving, and slidably engaging the bolt assembly swivel head. The pulling arm defines a pulling arm recess for receiving and slidably engaging the bolt assembly swivel washer.

The pivotal engagement of the steering box shaft recess to the lever arm fixed pivot, in combination with the pivotal connecting between the linking arm and the lever arm enable the puller arm to continually urge the pitman arm to translate radially along the steering box shaft as the bolt assembly is tightened, thereby urging the pitman arm to disengage from the steering box shaft.

A method of removing a pitman arm from a steering box shaft, while the steering box shaft remains in its operating position, is also provided. The method commences by disposing a puller arm along a first side of the pitman arm, intermediate the pitman arm and the steering box.

The method proceeds by disposing a lever arm proximate the second side of the pitman arm, in abutting relation with the first end of the steering box shaft. The lever arm defines a "U" shaped recess for receiving the steering box shaft, which connects the steering box to the pitman arm. A connecting arm is then connected to both first end of the puller arm and a first end of the lever arm.

A second end of the puller arm, and a second end of the lever arm, are then connected by a bolt assembly, which is tightened to pull the puller arm closer to the lever arm, thereby pulling the pitman arm radially along the steering box shaft until the pitman arm is disengaged from the steering box shaft.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE PRESENT PREFERRED EMBODIMENT

Figure 1:
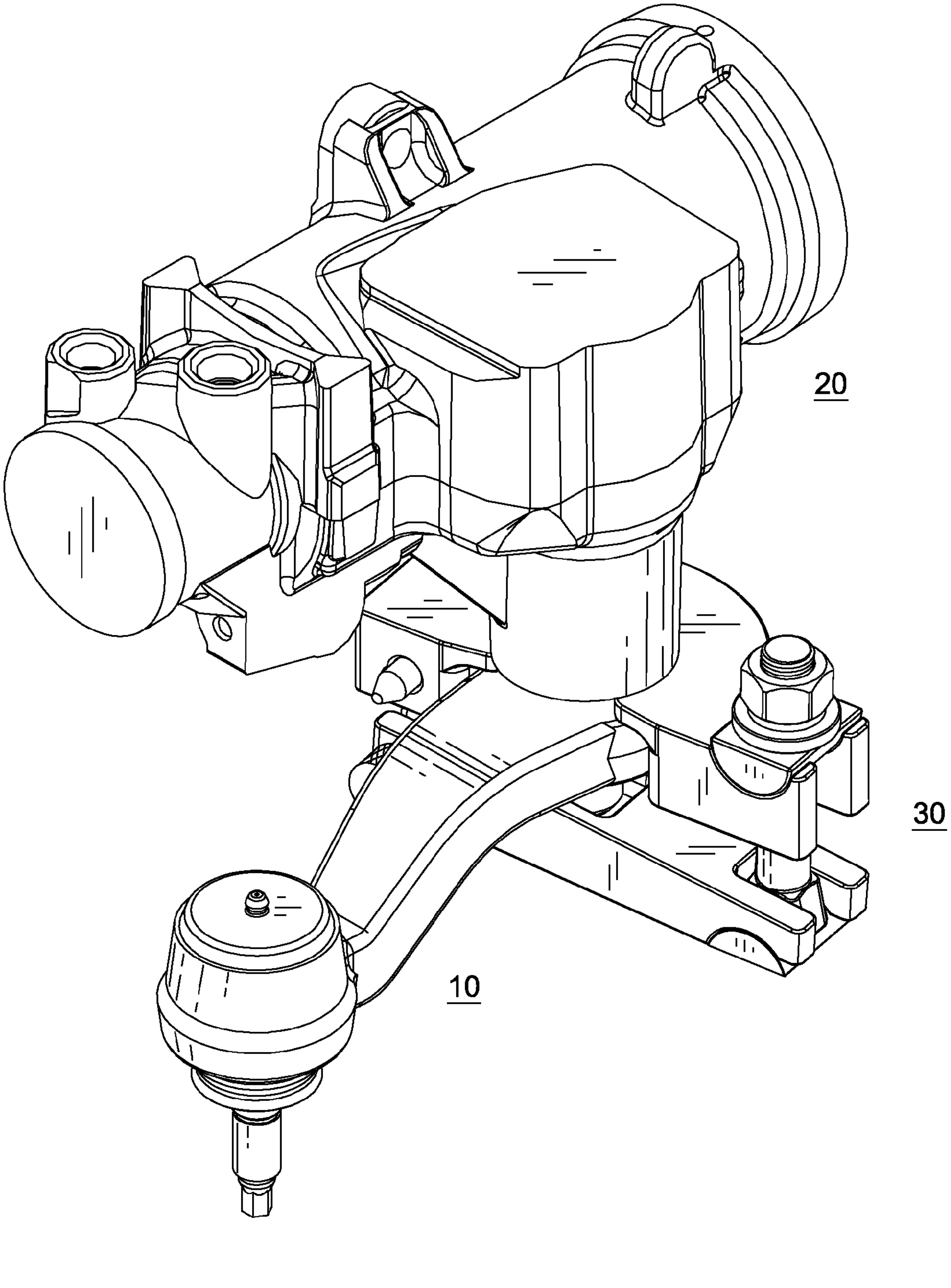
FIG. 1 is a perspective view of a pitman arm connected to a steering box, with a pitman arm removal tool installed.

The description below sets forth one embodiment of the invention used to remove the pitman arm from the steering box shaft. It is to be understood that the embodiment illustrated and described below is intended to be exemplary, and that modifications of the described embodiment may be implemented without departing from the broader aspects of the present invention.

Before providing a detailed description of the construction and operation of the disclosed embodiment, in connection with the appended drawings, an overview of the present invention, along with a method of use, is provided below.

This invention includes pitman arm removal tool and a method of removing a pitman arm, using the pitman arm removal tool, or similar device. In general, the method is to remove the fasteners attaching the sway bar to the underbody frame allowing access to the steering box and pitman arm. Once the sway bar is removed, the "U" shaped puller arm can be inserted under the pitman arm between the pitman arm and the steering box. Then the lever arm can be located below the steering box shaft, and below the pitman arm, aligning the self centering pivot onto the steering box shaft recess and each end of the lever arm through hole under the "U" shaped puller portion aligning the through holes. Once the "U" shaped puller arm and self centering lever arm are aligned in their respective locations on the pitman arm/steering box, a linking arm can be inserted and aligned, such that the through holes in the "U" shaped puller arm and the self centering lever arm through holes are aligned. A clevis pin can then be inserted into each of the through holes at the end of the "U" shaped puller arm, and the self centering lever arm, allowing attachment of the "U" shaped puller arm and the self centering lever arm at opposite ends of the linking arm as an assembly. Once the "U" shaped pulling arm and self centering lever arm are attached with the lever arm, the swivel slide clamping bolt assembly can be attached to the opposite ends of the "U" shaped pulling arm and the self centering linking arm. The nut is loosened from the bolt, and the half cylinder bolt head is laid into the swivel slide recess of the "U" shaped puller portion. The threaded portion of the bolt is located through the self centering lever arm as to extend from the outer surface of the self centering lever arm to the "U" shaped puller arm. The half cylinder swivel washer can be placed over the bolt threads, and slid towards the self centering lever arm swivel recess, with the circular portion of the half cylinder swivel against the self centering lever arm swivel slide recess. The nut can be threaded over the bolt threads until the swivel slide clamping bolt assembly pulls the "U" shaped puller arm and self centering lever arm together placing, clamping pressure on the steering box shaft, and pulling the pitman arm towards the end of the steering box shaft, thereby designing the pitman from the steering box shaft.

Alignment of the pulling force between the "U" shaped puller arm and self centering lever arm keeps the pitman arm center line aligned with the steering box shaft center line as the pitman arm is removed. That alignment is accomplished by allowing the "U" shaped puller arm and self centering lever arm to move through the clevis pin rotation points as pressure is increased between the "U" shaped puller arm and the self centering lever arm. The half cylinder bolt assembly allows the "U" shaped puller arm and self centering lever arm to articulate and keep the pulling center line 50 of the pitman arm and steering box shaft aligned. The half cylinder bolt assembly alignment rotates to eliminate half cylinder bolt assembly misalignment when the nut is tightened and the resulting pressure pulls the pitman arm from the steering box shaft.

Referring now to the drawings and more particularly to FIG. 1 there is shown a perspective view of pitman arm 10 connected to steering box 20. The pitman arm removal tool 30 is shown disposed about the pitman arm 10. As described below, the pitman arm removal tool 30 functions to radially translate the pitman arm 10 along a steering box shaft 12 to separate the pitman arm 10 from the steering box 20. After the pitman arm is separated, a new pitman arm may be installed.

Figure 2:
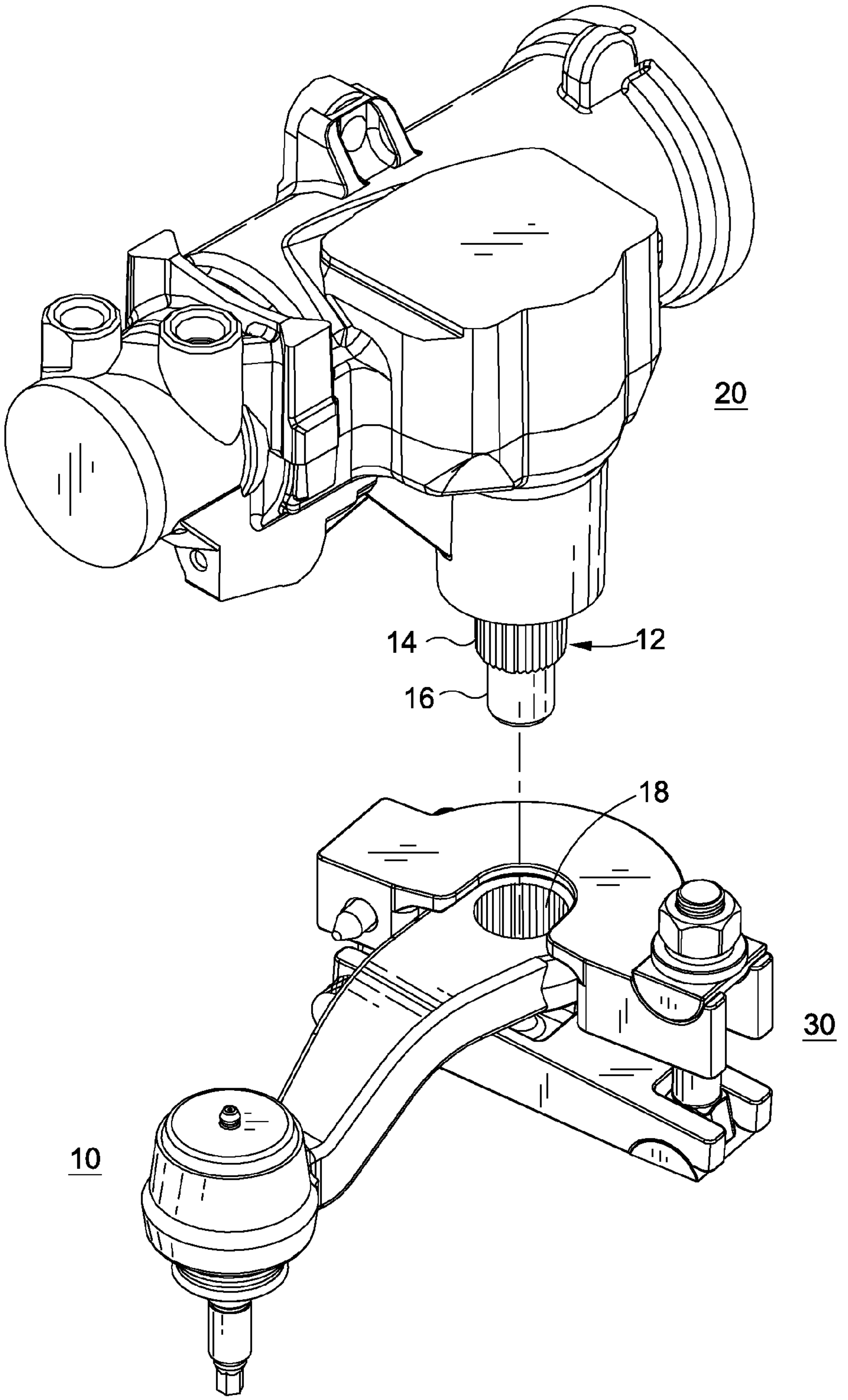
FIG. 2 is a perspective view of a pitman arm after removal from the steering box, with a pitman arm removal tool installed.

FIG. 2 is a perspective view showing the pitman arm 10 and the puller arm removal tool 30, after they have been removed from steering box shaft 12. As it can be seen at FIG. 2, the steering box shaft 12 includes a male spline portion 14 and a shaft extension 16. The male spline portion 14 is engageable to pitman arm female spline 18, formed within the pitman arm 10. The steering box shaft extension 16 extends beyond the pitman arm female spline 18 and abuts against the lever arm 24, as described in more detail below.

Figure 3:
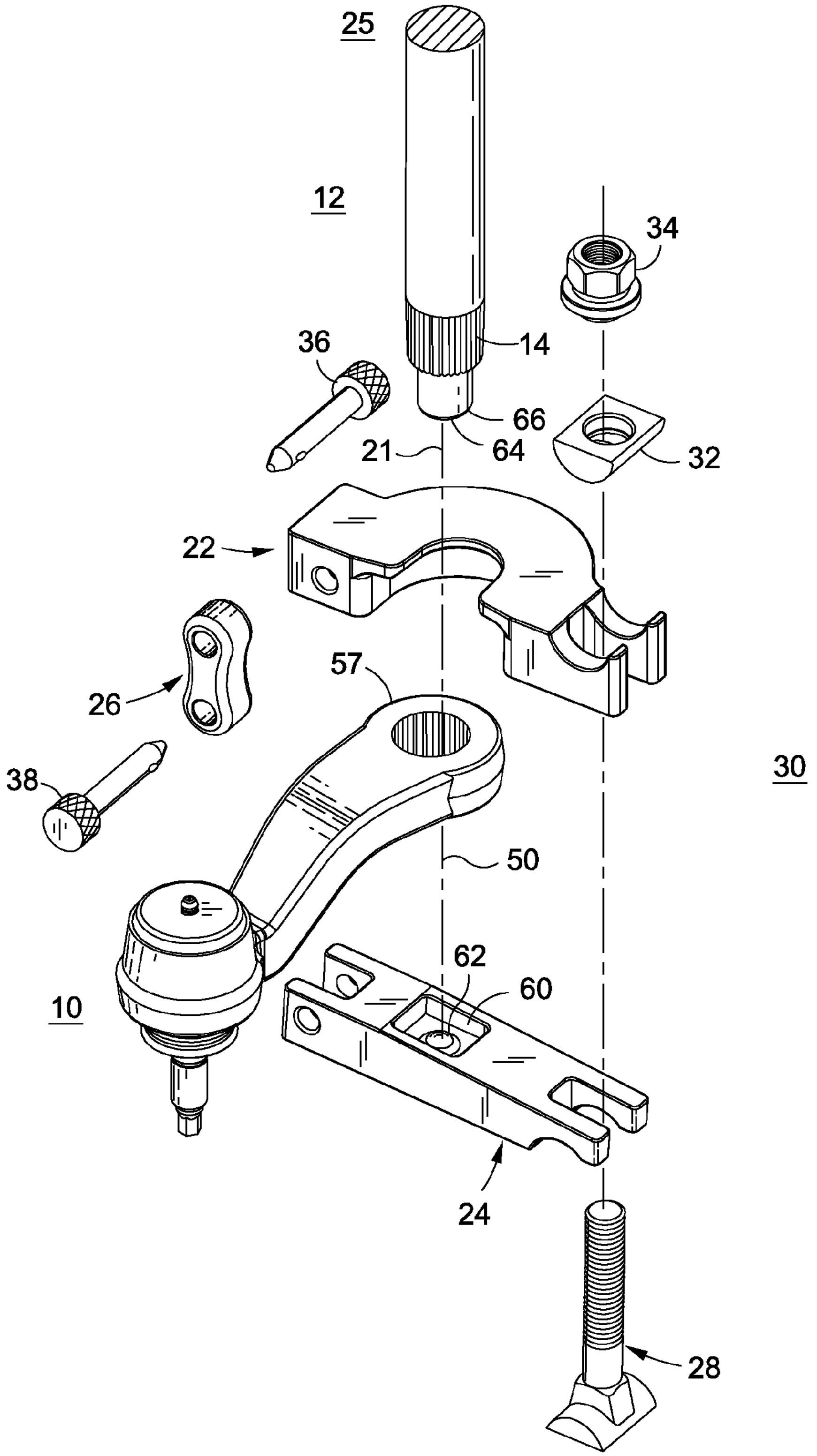
FIG. 3 is an exploded view of the pitman arm removal tool about the pitman arm and steering box shaft.
Figure 4:
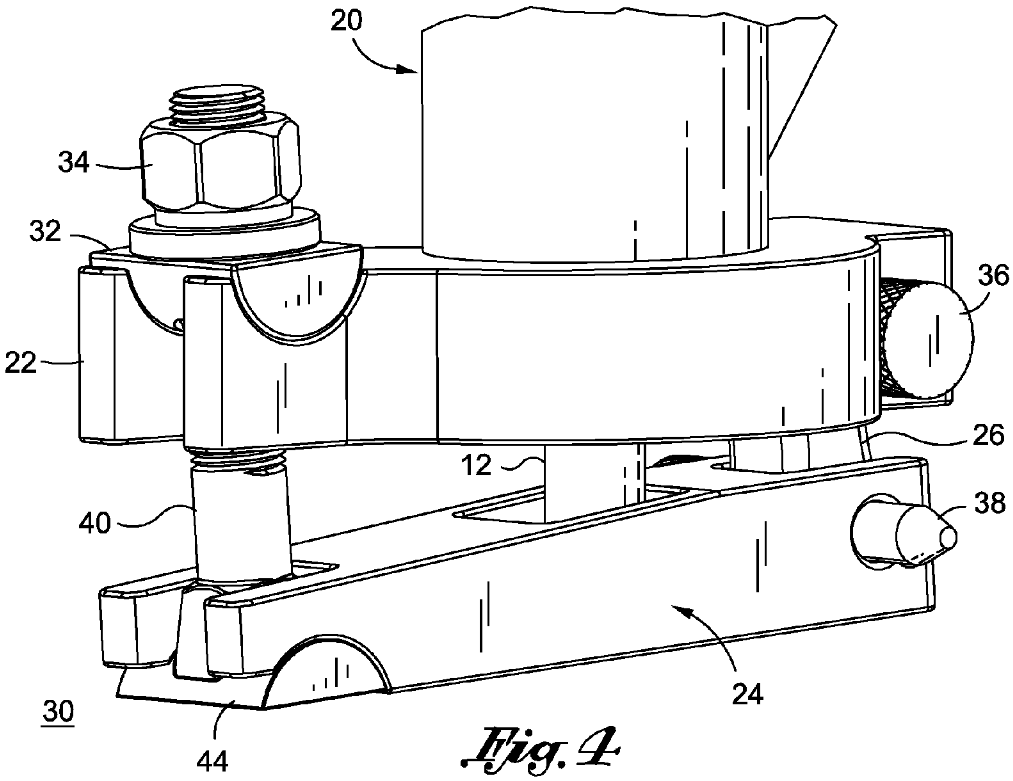
FIG. 4 is a perspective view of the pitman arm removal tool and the steering box shaft.

FIG. 3 provides an exploded view of the exemplary pitman arm removal tool 30, in association with the pitman arm 10 and the steering box 20. As shown at FIG. 3 the removal tool 30 includes a puller arm 22, a lever arm 24, a linking arm 26, and a bolt assembly 40 comprising swivel head bolt 28, swivel washer 32, and a nut 34. As shown at FIGS. 3 and 4, the steering box shaft 12 defines a center line 21. The translation of the pitman arm removal tool relative to the steering box shaft 12 center line 50 of the pitman arm removal tool. Center lines 21 and 50 are coaxial.

The linking arm 26 connects a first end of the puller arm 22 to a first end of the lever arm 24. The linking arm 26 defines apertures 64 for receiving clevis pins 36, and 38. Clevis pin 36 functions to pivotally connect the linking arm 26 to the puller arm 22. Clevis pin 38 functions to pivotally connect the linking arm 26 to the lever arm 24.

Referring to FIGS. 3-8, the construction and the function of the various component parts of the pitman arm removal tool is described and illustrated in more detail. FIG. 4 illustrates the pitman arm removal tool 30 in association with the steering box 20, after the pitman arm has been removed from the steering box shaft 12.

FIG. 4 shows the puller arm 22 connected to the lever arm 24 by the linking arm 26 and the bolt assembly 40. The puller arm 22 defines a recess 42 for receiving and slidably engaging bolt head 44 of bolt 28. Similarly, the lever arm 24 defines a recess 46 for receiving and slidably engaging swivel washer 32. It should be understood that the bolt head assembly can be reversed so that the bolt head 28 is disposed in the lever arm recess 46, and the swivel washer 32 is disposed in the puller arm recess 42. The particular orientation of the bolt assembly 40 is selectable depending upon which orientation provides greater accessibility for the particular vehicle in use. For example, it may be preferable to orient the bolt assembly 40 such that the nut 34 is in the best position to facilitate tightening and loosing of the bolt assembly 40.

Apertures 48 of puller arm 22 are formed to receive clevis bolt 36. Similarly, apertures 52 are formed in lever arm 24 to receive and engage clevis pin 38.

Figure 5:
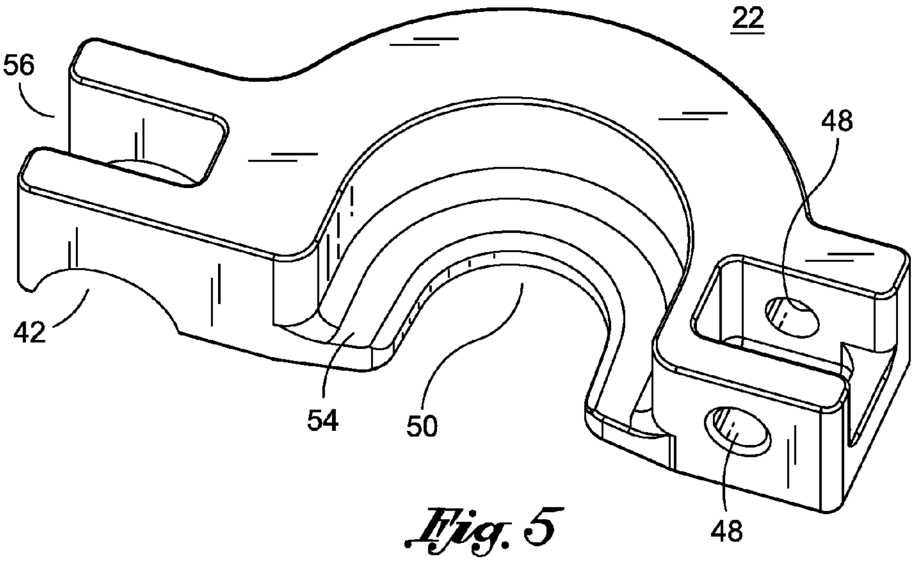
FIG. 5 is a perspective view of the puller arm of the pitman arm removal tool.

As shown at FIGS. 3 and 5, puller arm 22 includes a substantially "U" shaped recess 50 formed to receive and extend about a portion of steering box shaft 12. The puller arm 22 further defines a substantially "U" shaped surface 54, designed to receive and abut against receive pitman arm first surface 57. As the bolt assembly 40 is tightened the puller arm surface 54 urges the pitman arm first surface 57 to translate radially along steering box shaft 12 until the pitman arm female spline 18 disengages the steering box spline 14.

Channels 56, 58 are formed in the puller arm 22 and lever arm 24, respectively, to allow insertion of the bolt assembly 40, connecting the puller arm 22 and lever arm 24.

Figure 6:
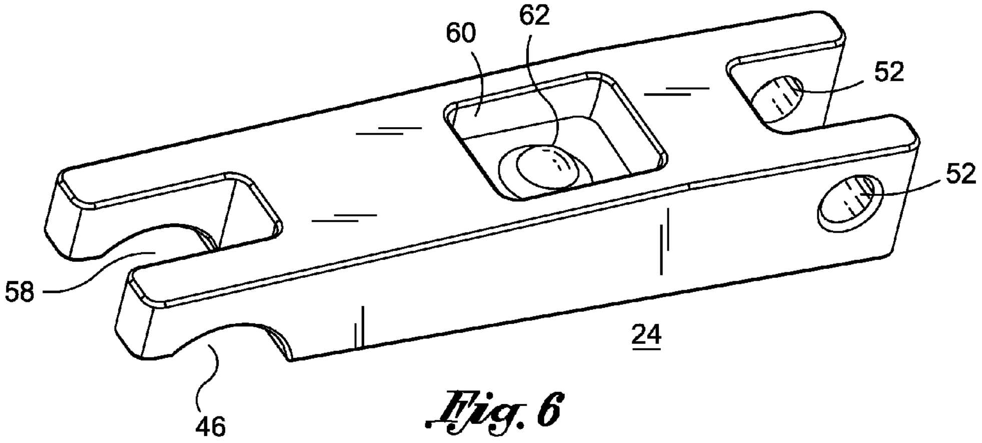
FIG. 6 is a perspective view of the lever arm of the pitman arm removal tool.
Figure 7:
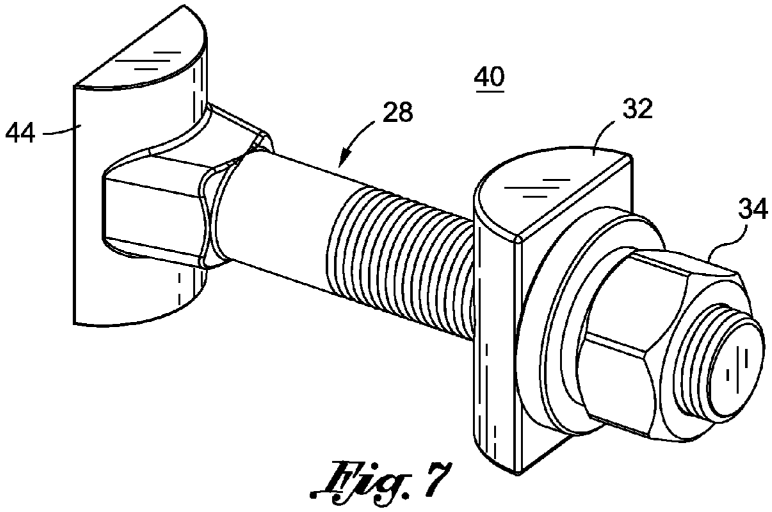
FIG. 7 is a perspective view of the adjustable bolt assembly of the pitman arm removal tool.
Figure 8:
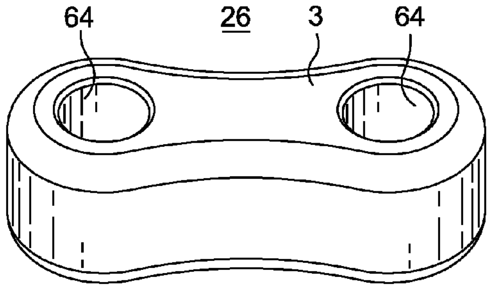
FIG. 8 is a prospective view of the linking arm of the pitman arm removal tool.
Figure 9A:
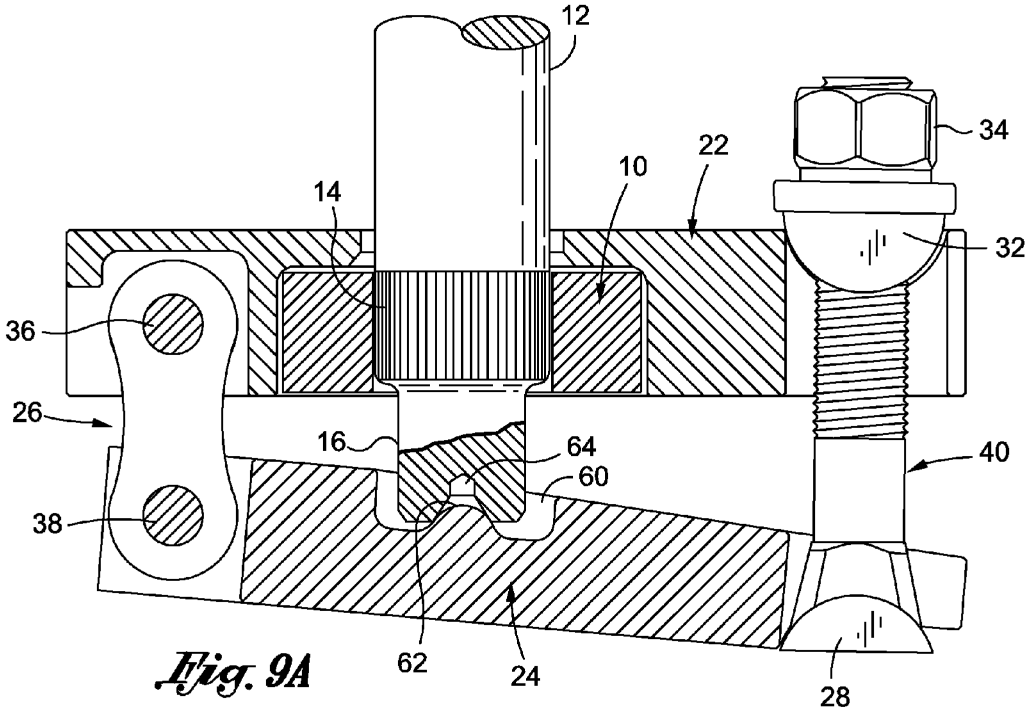
FIGS. 9A and 9B are cross-sectional views of the pitman arm removal tool, showing the orientation of the parts as the bolt assembly is tightened.
Figure 9B:
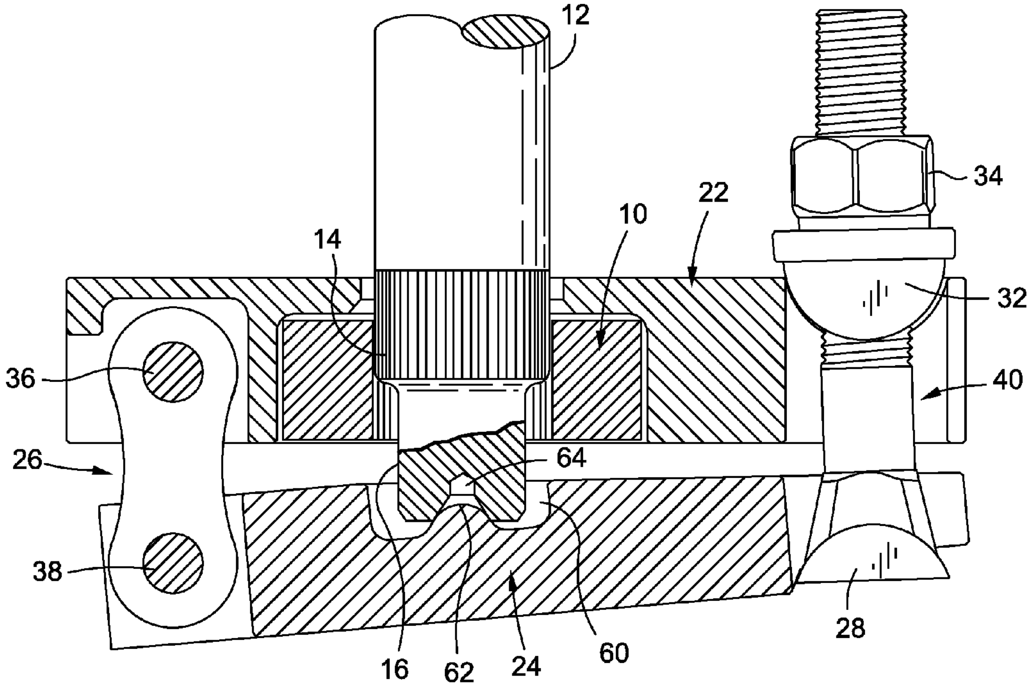

As shown in FIGS. 6, 9A and 9B lever arm 24 further defines a recess 60 and a fixed pivot 62. The fixed pivot 62 is sized to engage recess 64 formed in the distal end 66 of steering box shaft 12. Engagement of the steering box shaft 12 to the lever arm recess 60 precludes the shaft from translating relative to the lever arm as the bolt assembly is tightened. As a result, the puller arm 22 urges the first surface 57 of pitman arm 10 to translate radially along shaft 12, until the pitman arm female spline 18 disengages spline 14 of the steering box shaft 12.

FIGS. 9A and 9B show the movement of the pitman arm removal tool as the bolt assembly 40 is tightened. As shown therein, as the bolt assembly 40 is tightened the right hand portion of the lever arm 24 is drawn toward the puller arm 22 and the recess 64, formed in the distal end of steering box shaft 12, pivots about fixed pivot 62, formed in lever arm recess 60. Notably the recess 60 is formed to define a recess wider than the steering box shaft extension 16, to allow the steering box shaft recess 64 to freely pivot about fixed pivot 62, thereby centering the puller arm 22 normal to steering box shaft 12 as the pitman arm 10 translates radially along steering box shaft 12, to disengage the pitman arm female spline 18 from the steering box spline 14.

As the bolt assembly 40 is tightened, centering of the pitman arm is also facilitated by pivotal action of the bolt assembly 40 and of the linking arm 26. As previously mentioned, the bolt assembly 40 defines swivel bolt head 28 and swivel washer 32, which are pivotable within puller arm recess 42 and lever arm recess 46, respectively. Linking arm 26 is pivotally engaged to puller arm 22 and lever arm 28, by clevis pins 36, 38, respectively. The pivotal connections linking the puller arm 22 and lever arm 24 allow for lateral translation of the lever arm 24 relative to the puller arm 22, to further facilitate centering of the puller arm 22 along the shaft 12, as the bolt assembly 40 is tightened. Otherwise, as the bolt assembly is tightened, the puller arm might be urged to translate in a direction other than radially along the steering box shaft 12, potentially causing the pitman arm to bind against the steering box shaft 12, precluding the removal of the pitman arm. However, the pivotal connection of the linking arm 26 to puller arm 22 and lever arm 24, as well as the pivotable engagement of the bolt assembly 40 to the puller arm 22 and lever arm 24, in combination with the pivoting of steering box shaft recess 64 to pivot relative to the fixed pivot 62, allows the pitman arm 10 to continue to travel radially along shaft 12, without binding. Consequently, the bolt assembly 40 can continued to be tightened until the pitman arm is fully disengaged from the steering box shaft.

As indicated above, the foregoing description is intended to describe an exemplary embodiment of the invention, and that with various modifications, updates, and/or enhances may be implemented without departing from the broader scope or spirit of the invention, as set forth in the claims below.

What is claimed is:

1. A pitman arm removal tool for removing a pitman arm from a steering box shaft, the steering box shaft extending through the pitman arm and defining a male spline in sliding engagement with a pitman arm female spline, the removal tool comprising:

a puller arm for engaging a first surface of the pitman arm, the puller arm defining a substantially "U" shaped recess for receiving the steering box shaft;

a lever arm disposed proximate a second surface of the pitman arm, in substantially space opposed relation with the puller arm, the lever arm defining a fixed pivot for receiving and engaging a first end of the steering box shaft wherein the steering box shaft defines a recess at a distal end thereof, the recess being sized to engage the fixed pivot;

a linking arm connecting a first end of the lever arm to a first end of the puller arm, the linking arm being pivotally connected to the lever arm and the puller arm; and an adjustable bolt assembly connecting a second end of the lever arm to a second end of the puller arm, the bolt assembly being adjustable to draw the puller arm closer to the lever arm, thereby urging the pitman arm female spline to traverse the steering box shaft and out of engagement with the steering box shaft spline; and wherein the puller arm and the lever arm are pivotally connected, at first and second ends thereof, to maintain the lever arm fixed pivot at a location directly below the steering box shaft recess as the adjustable bolt assembly is adjusted to draw the puller arm closer to the lever arm.

2. The pitman arm removal tool as recited in claim 1 wherein the puller arm urges the pitman arm to travel radially along the steering box shaft as the bolt assembly is tightened.

3. The pitman arm removal tool as recited in claim 2 wherein the engagement of the steering box shaft first end to the lever arm recess precludes radial movement of the steering box shaft relative to the lever arm as the pitman arm traverses the steering box shaft.

4. The pitman arm removal tool as recited in claim 1 wherein the lever arm fixed pivot and the steering box shaft recess remain pivotally engaged as the bolt assembly is tightened.

5. The pitman arm removal tool as recited in claim 4 wherein the lever arm pivots relative to the linking arm as the bolt assembly is tightened.

6. The pitman arm removal tool as recited in claim 5 wherein the linking arm pivots relative to the pulling arm as the bolt assembly is tightened.

7. The pitman arm removal tool as recited in claim 6 wherein pivoting of the steering box shaft recess relative to the fixed pivot, in combination with the pivoting of the linking arm relative to the pulling arm enables the pulling arm to continually urge the pitman arm to translate radially along the steering box shaft as the bolt assembly is tightened.

8. The pitman arm removal tool as recited in claim 7 wherein the bolt assembly includes a swivel bolt head, a swivel washer and a nut.

9. The pitman arm removal tool as recited in claim 8 wherein the lever arm defines a lever arm recess for receiving and slidably engaging the bolt assembly swivel head and the pulling arm defines a pulling arm recess for receiving and slidably engaging the bolt assembly swivel washer.

10. The pitman arm removal tool as recited in claim 9 wherein the lever arm, and the pulling arm each define a channel formed on the second end thereof, for receiving the bolt assembly shaft.

11. The pitman arm removal tool as recited in claim 10 wherein the bolt assembly swivel head is in slidable engagement with the lever arm recess as the bolt assembly is tightened.

12. The pitman arm removal tool as recited in claim 11 wherein the bolt assembly swivel washer is in slidable engagement with the puller arm recess as the bolt assembly is tightened.

13. The pitman arm removal tool as recited in claim 1 wherein the puller arm and the lever arm are pivotally linked such that the puller arm maintains a substantially perpendicular orientation relative to the steering box shaft, as the bolt assembly is adjusted to urge the pitman arm spline out of engagement with the steering box shaft spline.

14. The pitman arm removal tool as recited in claim 1 wherein the puller arm defines a center line that is coaxial with the steering box shaft, and wherein the lever arm is self-centering with respect to the steering box shaft to keep the pulling arm center line and the steering box shaft center line aligned as the adjustable bolt assembly is tightened.

15. The pitman arm removal tool as recited in claim 14 wherein the self-centering lever arm articulates to keep the pulling center line of the pitman arm and the steering box shaft aligned.

16. A method of removing a pitman arm from a steering box shaft defining a steering box shaft center line, while the steering box remains in its operating position, the method comprising:

disposing a puller arm along a first side of the pitman arm, intermediate the pitman arm and the steering box, the puller arm defining a substantially "U" shaped recess for receiving the steering box shaft connecting the steering box to the pitman arm;

disposing a lever arm proximate a second side of the pitman arm, in abutting relation with a first end of the steering box shaft;

connecting both a first end of the puller arm and a first end of the lever arm to a linking arm;

connecting a second end of the puller arm and a second end of the lever arm by a bolt assembly;

tightening the bolt assembly such that the puller arm pulls closer to the lever arm, thereby pulling the pitman arm radially along the steering box shaft center line until the pitman arm is disengaged from the steering box shaft; and pivotally connecting the linking arm to the puller arm and lever arm, and pivoting the orientation of the linking arm relative to the puller arm and lever arm such that the puller arm maintains a substantially perpendicular orientation relative to the steering box shaft as the bolt assembly is tightened, thereby urging the pitman arm to translate radially along the steering box shaft center line, out of engagement with the steering box shaft, as the bolt assembly is tightened.

* * * * *